United States Patent

Ohara et al.

Patent Number: 5,276,619
Date of Patent: Jan. 4, 1994

[54] ELECTRONIC CONTROL SYSTEM WITH SELF-DIAGNOSTIC FUNCTION FOR USE IN MOTOR VEHICLE

[75] Inventors: Kouichi Ohara, Aichi; Naoyuki Kojima, Kariya, both of Japan

[73] Assignee: Nippondenso Co., Ltd., Kariya, Japan

[21] Appl. No.: 680,891

[22] Filed: Apr. 5, 1991

[30] Foreign Application Priority Data

Apr. 6, 1990 [JP] Japan .................. 2-92535

[51] Int. Cl.$^5$ ..................... G01M 15/00; F02B 3/00
[52] U.S. Cl. ..................... 364/424.04; 364/431.12; 123/479
[58] Field of Search ............... 364/424.03, 424.04, 364/424.01, 431.11, 431.12; 371/53; 123/479

[56] References Cited

U.S. PATENT DOCUMENTS

| | | | |
|---|---|---|---|
| 4,258,421 | 3/1981 | Juhasz et al. | 364/424.04 |
| 4,271,402 | 6/1981 | Kastura et al. | 364/431.12 |
| 4,497,057 | 1/1985 | Kato et al. | 37.1/29 |
| 4,805,576 | 2/1989 | Abe et al. | 123/479 |
| 4,843,557 | 6/1989 | Ina et al. | 364/431.11 |
| 4,850,325 | 7/1989 | Abe et al. | 123/479 |
| 4,864,998 | 9/1989 | Onishi | 123/489 |
| 4,943,924 | 7/1990 | Kanegae et al. | 364/431.12 |
| 5,050,080 | 9/1991 | Abe | 364/424.04 |
| 5,146,459 | 9/1992 | Shimizu | 371/21.5 |

FOREIGN PATENT DOCUMENTS

62-142849 6/1987 Japan .
62-291537 12/1987 Japan .

Primary Examiner—Thomas G. Black
Assistant Examiner—Tan Q. Nguyen
Attorney, Agent, or Firm—Cushman, Darby & Cushman

[57] ABSTRACT

An electronic control system with a self-diagnostic function for use in a motor vehicle, which is arranged to write the vehicle operation state data such as engine intake air amount at the time of no occurrence of abnormality into the internal memory of a microcomputer basically making up an electronic control system and, in response to the occurrence of abnormality, add check-function data to the operation state data which is in turn transferred to a backup memory. That is, at the time when abnormality occurs, the data whose significance is relatively high are stored in an internal storage of a microcomputer such as a non-volatile battery-backup RAM with check-function data being respectively added thereto so as to improve the data reliability. On the other hand, the data whose significance is relatively low are stored in an external storage such as a battery-backup RAM, together with check-function data for totally checking the data, thereby improving the data reliability. In addition, the storing of the data into two kinds of storages allows improvement of the storage capacity.

7 Claims, 4 Drawing Sheets

ELECTRONIC CONTROL SYSTEM WITH SELF-DIAGNOSTIC FUNCTION FOR USE IN MOTOR VEHICLE

BACKGROUND OF THE INVENTION

The present invention relates generally to electronic control systems for use in motor vehicles, and more particularly to such an electronic control system having a self-diagnostic function to self-diagnose the occurrence of abnormalities or malfunctions and store and keep data indicative of an operation state at the time of an occurrence of an abnormality.

Attempts to provide a self-diagnostic function to an electronic control system for use in a motor vehicle have been made heretofore, such a technique being disclosed in Japanese Patent provisional Publication No. 62-142849 in which data indicative of an operation state is written in a predetermined area of a random access memory (RAM) at a predetermined time interval so as to self-diagnose the occurrence of abnormalities of input/output devices such as various sensors and actuators. On the basis of the self-diagnostic results showing the occurrence of an abnormality, the electronic control system prohibits the writing operation of the operation state data after the occurrence of an abnormality and stores and keeps the operation state data such as the intake air amount and engine speed immediately before the occurrence of the abnormality.

There is a problem arising in such a conventional self-diagnostic function, however, in that the reliability of the stored data can be deteriorated because the operation state data immediately before the occurrence of an abnormality is arranged to be merely written in the RAM with a battery backup function. In addition, another problem arises in that, in the case of the occurrence of various kinds of abnormalities or the storage of large data, difficulty is encountered to meet the requirements for storing all the necessary data because of shortage of the storage area.

SUMMARY OF THE INVENTION

It is therefore an object of the present invention to provide an electronic control system with a self-diagnostic function which is capable of improving the reliability of the stored data concurrently with eliminating the storage area problem.

One feature of this invention is to write the vehicle operation state data such as an engine intake air amount at the time of no occurrence of abnormality into the internal memory of a microcomputer basically making up an electronic control system and, in response to the occurrence of an abnormality, add check-function data to the operation state data which is in turn transferred to a backup memory.

More preferably, at the time when an abnormality occurs, the data whose significance is relatively high is stored in an internal storage means of a microcomputer such as a non-volatile battery-backup RAM with check-function data being respectively added thereto so as to improve the data reliability. On the other hand, the data whose significance is relatively low is stored in an external storage means such as a battery-backup RAM, together with check-function data for totally checking the data, thereby improving the data reliability. This storage of the data into two kinds of storage means also allows improvement of the storage capacity.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
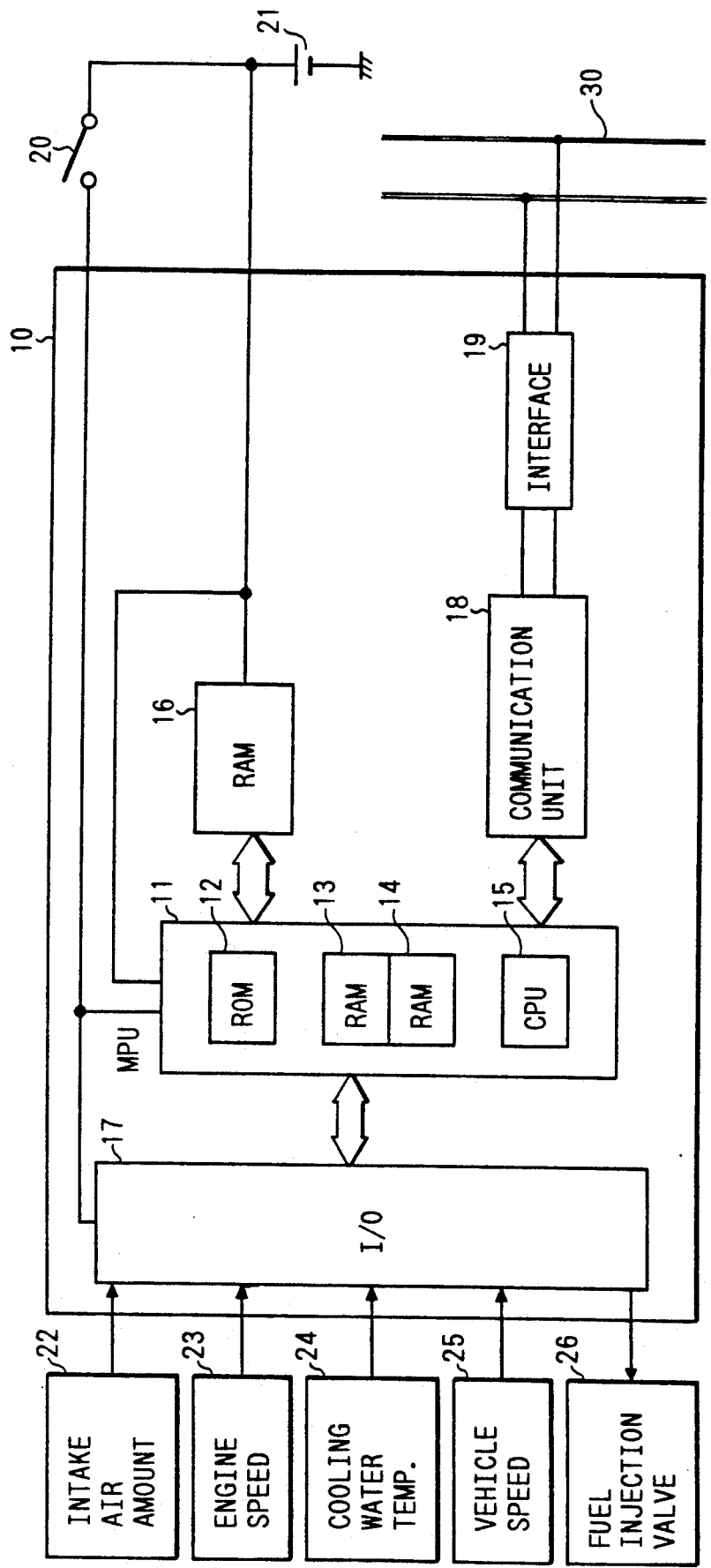
FIG. 1 is a block diagram schematically showing an arrangement of an electronic control system for use in a invention.

Referring now to FIG. 1, there is schematically illustrated an electronic control system according to an embodiment of the present invention which is for controlling an engine of a motor vehicle. In FIG. 1, the electronic control system, being illustrated at numeral 10, is connected to a multiplex transmission line 30 so as to be communicated with a repair tool, not shown, and further coupled to another electronic control system to construct a LAN system. The electronic control system 10, being constructed by a microcomputer, is equipped with a processing unit (MPU) 11, an external random access memory (RAM) 16 to be used as an external storage means, an input/output unit (I/O) 17, a communication unit 18, and an interface circuit 19. The MPU 11 is constructed using one-chip integrated circuit (IC) and provided with an internal read-only memory (ROM) 12, an internal RAM 13, a non-volatile internal RAM 14 to be used as an internal storage means, and a central processing unit (CPU) 15. For example, the Motorola-manufactured 68HCll can be used as the MPU 11. The internal RAM 13 is composed of a high-speed read/write-allowable dynamic RAM and the internal RAM 14 is composed of a low-power-consumption data-storable dynamic RAM. The MPU 11 is programmed so as to have functions such as a fuel injection control function and a self-diagnostic function for checking the occurrence of abnormalities in various sensors and actuators. A principal portion of the MPU 11 is coupled through an ignition switch 20 of the motor vehicle to a battery 21 mounted thereon, while the non-volatile RAM 14 is directly coupled to the battery 21 so as to be backed up by the battery 21 whereby the storage contents can be kept as it is irrespective of turning-off of the ignition switch 20.

The external RAM 16 is constructed by a CMOS type general IC and, as well as the RAM 14 of the MPU 11, directly coupled to the battery 21 to be backed up. The external RAM 16 is coupled to the MPU 11 whereby the transmission and reception of data can be effected with respect to the MPU 11 in accordance with the serial communication (for example, DMA). The I/O unit 17 is coupled to an engine intake air amount sensor 22, an engine speed sensor 23, an engine cooling water temperature sensor 24, a vehicle speed sensor 25 and others so that the detection signal of these sensors are led to the MPU 11. Further, the I/O unit 17 is coupled to a fuel injection valve 26 so as to output a pulse signal in accordance with the calculation results of the MPU 11, the fuel injection valve 26 being driven in accordance with the pulse signal therefrom. The communication unit 18 and interface circuit 19 are for the transmission of data from the MPU 11 to the multiplex transmission line 30 and further for the reception of data through the multiplex transmission line 30. For example, the communication unit 18 can be constructed by using the GE (RCA)-manufactured CPD68HC685i.

Figure 2:
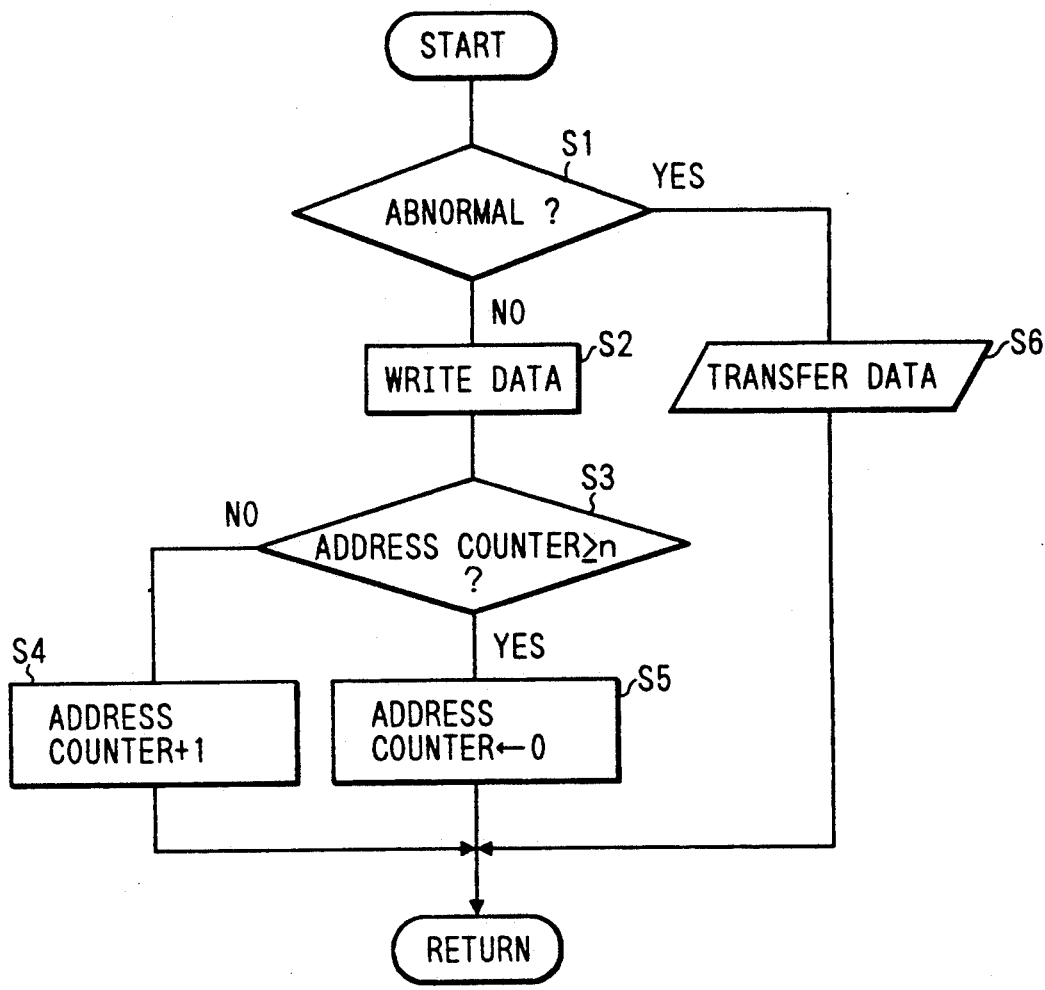
FIGS. 2 to 4 are flow charts for describing the operation to be executed by the FIG. 1 electronic control system.

FIG. 2 is a flow chart for writing the engine operation state data into the RAMs 13, 14 and 16. In FIG. 2, in response to the turning-on of the ignition switch 20, the address counter of the RAM 13 is set to "0", indicative of the head of the storage area, in accordance with the initializing process of a main routine, not shown. This operation starts with a step S1 to perform the self-diagnostics to check whether or not an abnormality occurs. If the answer of the step S1 is negative, a step S2 follows to write the engine operation state data into one of storage areas (which will hereinafter be referred to as frames) provided in the volatile RAM 13. A subsequent step S3 is provided in order to check whether or not the address counter indicates the final frame n. If the answer of the step S3 is negative, a step S4 follows to increment the value of the address counter by one, thereafter terminating this routine. On the other hand, if in the step S3 the address count indicates the final frame n, a step S5 is then executed so as to set the address counter to "0", thereafter terminating this routine. This routine is executed at a predetermined time interval whereby as indicated by (a) of FIG. 5 the latest operation state data such as an intake air amount $Q_o$, an engine speed $N_o$, a cooling water temperature $TW_o$ and a vehicle speed $SP_o$ which correspond to n patterns are successively stored in the RAM 13 of the MPU 11.

Figure 3:
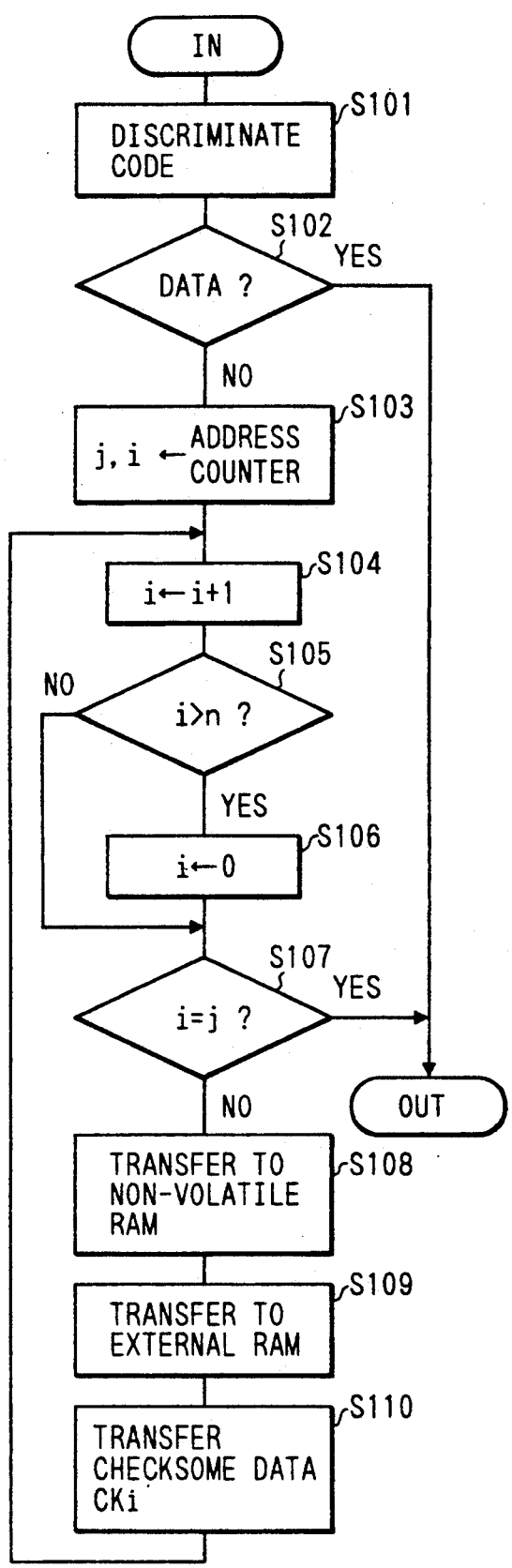

On the other hand, if the answer of the step S1 is "YES" indicative of the occurrence of an abnormality, a step S6 follows to transfer the data in the RAM 13 to the internal RAM 14 and further to the external RAM 16 so as to be written therein. FIG. 3 is a flow chart for describing the detailed process to be executed in the aforementioned step S6. The step S6 operation begins with a step S101 to discriminate a diagnosis abnormality code to be separately stored and kept in the non-volatile RAM 14, then followed by a step S102 to check whether data has already been transferred to an area corresponding to the diagnosis abnormality code. If so, this routine directly terminates. On the other hand, if the decision result of the step S102 is negative, that is, when no data is stored and the detection of an abnormality is for the first time, the following steps are executed in order to start the transferring of the data. After the address counter is set in steps S103 to S107, the data is transferred and written into the RAMs 14 and 16 in steps S108 to S110. First, in the step S103, the current value of the address counter is substituted into variables i and j. In the step S104 the value of the variable i is updated by adding one thereto, then followed by the step S105 to check whether the value of the variable i is greater than n indicative of the final frame. If the decision result is negative, the operational flow advances to the step S107 to check whether the value of the variable i is equal to the value of the variable j. If the answer of the step S107 is negative, the operational flow further goes to the step S108 where the significance-higher data of the data stored in the frame designated by the variable i is transferred and written to the non-volatile RAM 14, the data whose significance is higher includes the intake air amount $Q_i$ and the engine 1 speed $N_i$ where i=0 to n. In this case, as indicated by (b) of FIG. 5, the check-function (checksome) inversion data $\overline{Q_i}$ and $\overline{N_i}$ are respectively added to the normal data $Q_i$ and $N_i$, and then transferred thereto.

In the step S109, the significance-lower data (for example, the cooling water temperature $Tw_i$ and the vehicle speed $SP_i$) of the data stored in the frame designated by the variable i are transferred and written into the external RAM 16. In this case, in the next step S110, as the check-function data the total value $CK_i$ ($CK_i = Tw_i + SP_i + \ldots$) of the data of the frame are also transferred (the steps 108 and 109 act as a writing means). Accordingly, the operation state data and the total value $CK_i$ are written therein as indicated by (c) of FIG. 5.

On the other hand if the answer of the above-mentioned step S105 is affirmative, the step S106 follows to substitute "0" into the variable i, and the operational flow goes through the step S107 to the step 108. If the decision result of the step S107 is affirmative, this routine terminates.

Thus, the data transferring operation starts from the data corresponding to the address counter value+1, and in response to data corresponding to the current address of the address counter being transferred, the decision result of the step S107 becomes affirmative to cause this routine to terminate. With this operation, the data stored in the RAMs 14 and 16 are successively stored in order of the passage of time from the earliest data.

Figure 5:
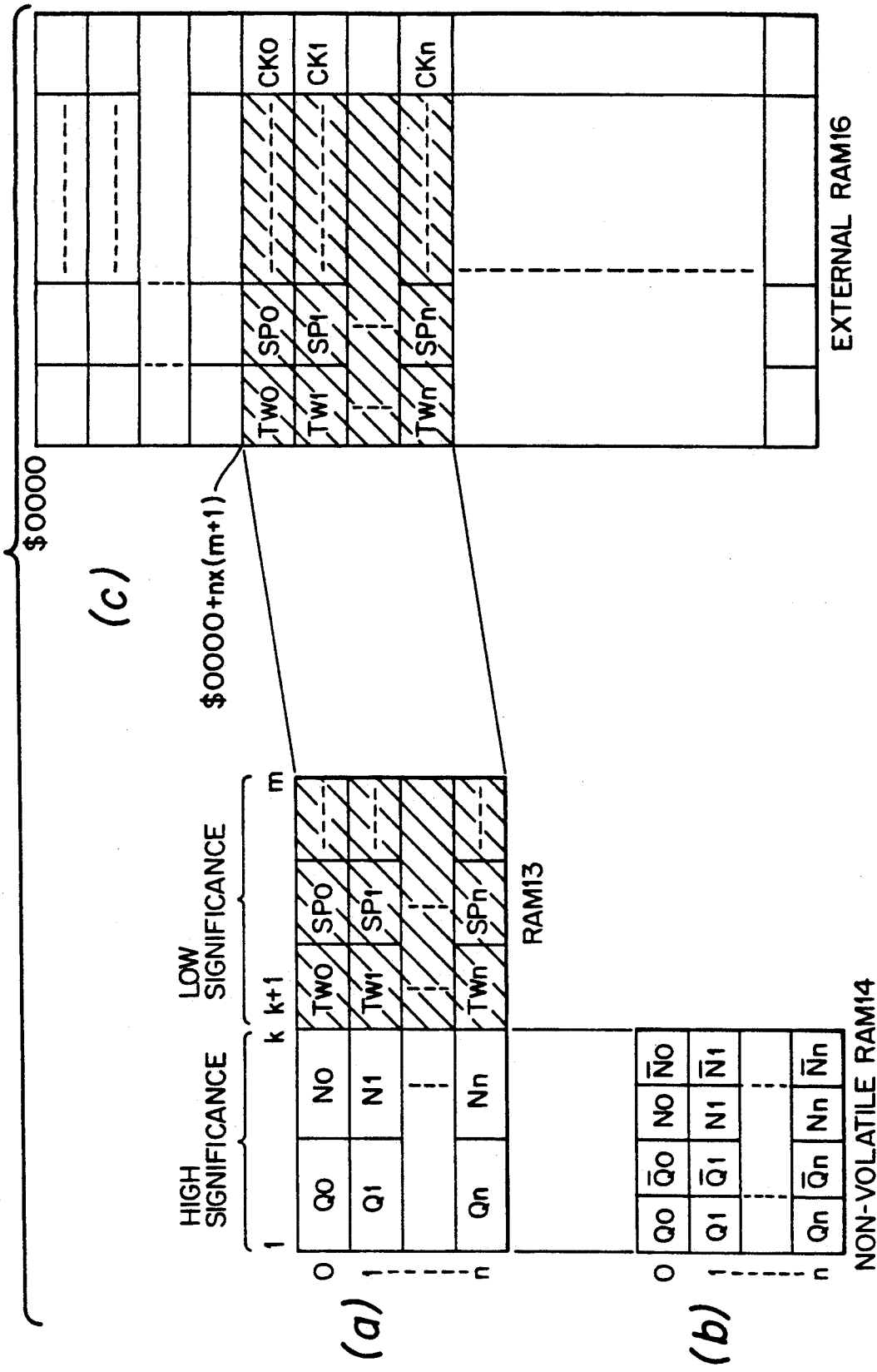
FIG. 5 is an illustration of a stored state of data.

The data storing areas are separately set in correspondence with the abnormality codes, and hence, as illustrated in FIG. 5, when n patterns of data, whose number is k (here, k=2), for N abnormalities are stored in the non-volatile RAM 14, $N \times k \times 2 \times (n+1)$ areas are required to be provided therein, and similarly the external RAM 16 is required to have $N \times (m-k+1) \times (n+1)$ areas.

Figure 4:
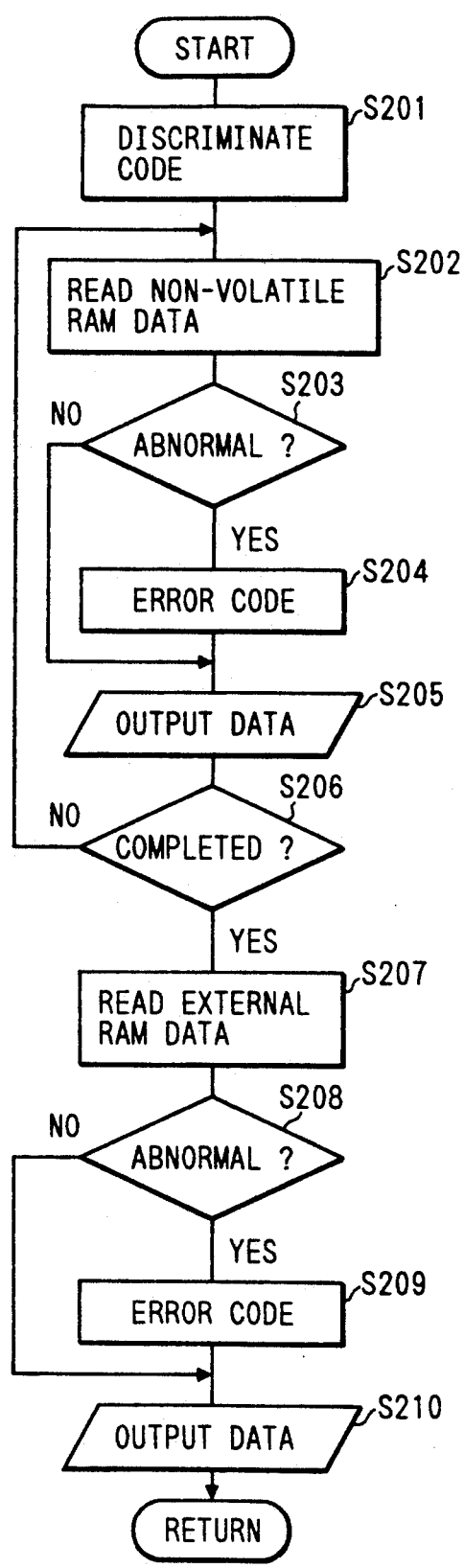

FIG. 4 is a flow chart for reading out the engine operation state data. The routine of FIG. 4 may be executed by providing a specific input condition with a repair tool being connected to the multiplex transmission line 30 in a repair factory. This routine starts with a step S201 to discriminate the abnormality code to be inputted through the multiplex transmission line 30 so as to decide the kind of information to be required. A step S202 follows to read the engine operation state data corresponding to the discriminated abnormality code, then followed by a step S203 to compare the read data with the inversion data so as to check the abnormality of the data. If the answer of the step S203 is affirmative, that is, if the data is abnormal, a step S204 follows to supply a given error code. If the answer of the step S203 is negative, the operational flow jumps to a step S205 to supply the data through the communication unit 18 and the interface circuit 19 to the multiplex transmission line 30. A subsequent step S206 is provided for checking the completion of the data supply. If not, the operation returns back to the step S202. On the other hand, if the decision result is "YES", the operation advances to a step S207 where the engine operation state data corresponding to the discriminated abnormality code are read out from the external RAM 16, then followed by a step S208 to compare the sum total of the read data with the check sum total CK so as to check the abnormality of the data. If the decision result is affirmative, the operational flow advances to a step S209 to supply a given error code. If negative, the operational follow jumps to a step S210 to cause the engine operation state data to be supplied through the communication unit 18 and the interface circuit 19 to the multiplex transmission line 30. The supplied data are converted into display data by the repair tool so as to be displayed on a display apparatus, thereby analyzing the abnormal state.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although an external RAM is used as the external storage means, it is also appropriate to use an EEPROM (for example, the μPD28C04 manufactured by Nippon Electric Co., Ltd.

What is claimed is:

1. An electronic control system for use in a motor vehicle which performs self-diagnostics by storing data indicative of an operation condition at a time when an abnormality occurs, comprising:

sensor means for sensing an operating condition of a motor vehicle and generating data indicative of said sensed operating condition, said data being categorized as either having high significance or low significance;

processing means for detecting an occurrence of an abnormality by analyzing data indicative of said operating condition, said processing means including a central processing unit and a write-allowable internal storage means for storing data indicative of said operating condition;

write-allowable external storage means for storing data indicative of said operating condition, said external storage means being located outside of said processing means;

writing means for writing data to said storage means, wherein a high significance data is written to said internal storage means and low significance data is written to said external storage means;

outputting means for outputting the data stored in said internal storage means and external storage means in response to a signal inputted from an external circuit.

2. An electronic control system as claimed in claim 1, wherein said processing means adds inversion data to said operating condition data categorized as having high significance, said inversion data and operating condition data being written to said write-allowable internal storage means.

3. An electronic control system as claimed in claim 1, wherein said internal storage means comprises a first RAM non-backed up by a battery and a second RAM backed up by said battery, said processing means being equipped with means for storing said operating condition data into said first RAM at a time when an abnormality does not occur and further equipped with means for transferring the high significance data from said first RAM to said second RAM and transferring the low significance data from said first RAM to said external storage means when an abnormality does occur.

4. An electronic control system as claim in claim 1, wherein said outputting means includes means for discriminating an abnormality code to be inputted from said external circuit, means for reading out the operating condition data corresponding to the discriminated abnormality code, means for comparing there ad-out data with predetermined data so as to check the abnormality of the data, means for supplying an error code to an external device in response to occurrence of the abnormality, and means for supplying the data to an external device in response to no occurrence of the abnormality.

5. An electronic control system for use in a motor vehicle which performs self-diagnostics in terms of abnormalities, comprising:

an intake air amount sensor for sensing an intake air amount into an engine of said motor vehicle and generating a detection signal indicative of the sensed intake air amount;

an engine speed sensor for sensing an engine speed and generating a detection signal indicative of the sensed engine speed;

a cooling water temperature sensor for sensing a temperature of a cooling water of said engine and generating a detection signal indicative of the sensed cooling water temperature;

a processing unit, responsive to said detection signals from said sensors, for processing data corresponding to said detection signals, said processing unit being equipped with a microprocessor, a first write-allowable internal memory and a second write-allowable internal memory;

a write-allowable external memory backed up by a battery and provided at an outside of said processing unit so as to be electrically coupled to said processing unit; and wherein said processing unit is equipped with means for storing a plurality of data corresponding to all of said detection signals into said first internal memory at a time when an abnormality does not occur, means for transferring data corresponding to the sensed intake air amount and data corresponding to the sensed engine speed from said first internal memory to said second internal memory and transferring data corresponding to the sensed cooling water temperature from said first internal memory to said external memory when an abnormality occurs, and means for outputting the data stored in said second internal memory and external memory in response to a signal inputted from an external circuit.

6. An electronic control system for use in a motor vehicle, comprising:

a first sensor for sensing a first operation state and generating a first detection signal indicative of the sensed first operation state;

a second sensor for sensing a second operation state and generating a second detection signal indicative of the sensed second operation state, said second detection signal categorized as having a lower significance than said first detection signal;

a third sensor for sensing a third operation state and generating a third detection signal indicative of the sensed third operation state, said third detection signal categorized as having a lower significance than said first detection signal;

a processing unit, responsive to all of the detection signals from said first to third sensors, for processing data corresponding to all of the detection signals, said processing unit being equipped with a microprocessor, a first write-allowable internal memory and a second write-allowable internal memory backed up by a battery;

a write-allowable external memory backed up by said battery and provided outside of said processing unit so as to electrically coupled to said processing unit;

wherein said processing unit is equipped with means for storing a plurality of data corresponding to all the detection signals into said first internal memory at a time when an abnormality does not occur, and further equipped with means for adding first check-function data to said data corresponding to the detection signal of said first sensor and transferring them from said first internal memory to said second internal memory when an abnormality occurs, means for adding second check-function data to said data corresponding to the detection signals of said second and third sensors and transferring them from said first internal memory to said external memory when an abnormality occurs, said second check-function data being constructed by taking the sum of said second and third sensor data, and means for outputting said data stored in said second internal memory and external memory in response to a signal inputted from an external circuit.

7. An electronic control system for use in a motor vehicle, comprising:

sensor means for sensing an operation state of said motor vehicle and generating a detection signal indicative of the detected operation state;

a processing unit responsive to the generated detection signal to process data corresponding to the detection signal, said processing unit equipped with a microprocessor and a write-allowable internal memory;

a write-allowable backup memory electrically coupled to said processing unit;

wherein said processing unit has means for storing a plurality of data corresponding to said detection signal into said memory when an abnormality does not occur, means for adding check-function data to the data stored in said internal memory, means for transferring said data from said internal memory to said backup memory when the abnormality occurs, and means for outputting any data in said internal memory and external memory in response to a signal inputted from an external circuit.

* * * * *